United States Patent
Mishra et al.

(10) Patent No.: US 11,451,468 B2
(45) Date of Patent: Sep. 20, 2022

(54) MANAGEMENT FRAMEWORK FOR BIER IN-BAND TRAFFIC ACCOUNTING AND PATH MONITORING

(71) Applicant: Cisco Technology, Inc., San Jose, CA (US)

(72) Inventors: Mankamana Prasad Mishra, San Jose, CA (US); Rajiv Asati, Morrisville, NC (US); IJsbrand Wijnands, Leuven (BE); Stephane Litkowski, Liffre (FR); Nitin Kumar, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 17/160,508

(22) Filed: Jan. 28, 2021

(65) Prior Publication Data

US 2022/0239585 A1 Jul. 28, 2022

(51) Int. Cl.
*H04L 45/16* (2022.01)
*H04L 45/24* (2022.01)
*H04L 12/46* (2006.01)
*H04L 69/22* (2022.01)
*H04L 12/18* (2006.01)

(52) U.S. Cl.
CPC .......... *H04L 45/16* (2013.01); *H04L 12/1854* (2013.01); *H04L 12/4641* (2013.01); *H04L 45/24* (2013.01); *H04L 69/22* (2013.01)

(58) Field of Classification Search
CPC . H04L 45/16; H04L 12/1854; H04L 12/4641; H04L 45/24; H04L 69/22
See application file for complete search history.

(56) References Cited

U.S. PATENT DOCUMENTS

| 10,608,922 B2 * | 3/2020 | Dutta .................. H04L 61/2069 |
| 10,616,063 B1 * | 4/2020 | Dutta .................... H04L 65/607 |
| 2015/0078378 A1 * | 3/2015 | Wijnands ................ H04L 12/18 370/390 |

(Continued)

OTHER PUBLICATIONS

Manage Engine, "Router Configuration Management using Network Configuration Manager", Cisco Config. Management—ManageEngine NCM, Dec. 7, 2020, 3 pages.

(Continued)

*Primary Examiner* — Kibrom T Hailu
(74) *Attorney, Agent, or Firm* — Edell, Shapiro & Finnan, LLC

(57) ABSTRACT

A method is performed at a router configured to perform Bit Index Explicit Replication (BIER) for forwarding of multicast packets in a network. The method includes, upon receiving a multicast packet of a multicast flow, accessing flow mappings in which multicast flows are mapped to fixed accounting values corresponding to the multicast flows. The method further comprises generating a BIER header for the multicast packet by encoding a multi-segment entropy field of the BIER header with (i) a variable entropy value for equal-cost multi-path (ECMP) load balancing, and (ii) a fixed accounting value among the fixed accounting values that is mapped to the multicast flow in the flow mappings. The method also includes encapsulating the multicast packet with the BIER header to produce an encapsulated multicast packet, and forwarding the encapsulated multicast packet.

20 Claims, 9 Drawing Sheets

(56) References Cited

U.S. PATENT DOCUMENTS

| | | | |
|---|---|---|---|
| 2015/0131658 A1* | 5/2015 | Wijnands | H04L 45/7453 370/390 |
| 2015/0131660 A1* | 5/2015 | Shepherd | H04L 45/74 370/390 |
| 2016/0127139 A1 | 5/2016 | Tian et al. | |
| 2017/0099232 A1 | 4/2017 | Shepherd et al. | |
| 2018/0091426 A1* | 3/2018 | Bao | H04L 43/16 |
| 2018/0287934 A1* | 10/2018 | Wang | H04L 12/4625 |
| 2019/0014034 A1 | 1/2019 | Allan | |
| 2019/0297000 A1* | 9/2019 | Dutta | H04L 45/16 |
| 2019/0386848 A1 | 12/2019 | Wang et al. | |
| 2020/0245206 A1* | 7/2020 | Allan | H04L 45/04 |
| 2021/0036950 A1* | 2/2021 | Zhu | H04L 45/742 |
| 2021/0112020 A1* | 4/2021 | Radhakrishnan | H04L 12/1886 |
| 2021/0119921 A1* | 4/2021 | Xie | H04L 45/16 |
| 2021/0320929 A1* | 10/2021 | Xie | H04L 12/4633 |

OTHER PUBLICATIONS

H. Song, Ed. et al., "Requirement and Solution for Multicast Traffic Telemetry draft-song-multicast-telemetry-00", Futurewei Technologies, Network Working Group, Jul. 1, 2019, 7 pages.

IJ. Wijnands, Ed. et al., "Multicast Using Bit Index Explicit Replication (BIER)", Internet Engineering Task Force (IETF), RFC 8279, Nov. 2017, 43 pages.

International Search Report and Written Opinion in counterpart International Application No. PCT/US2022/013229, dated Apr. 28, 2022, 14 pages.

Mirsky, et al. "Performance Measurement (PM) with Marking Method in Bit Index Explicit Replication (BIER) Layer," draft-ietf-bier-pmmm-oam-09, BIER Working Group, Internet-Draft, Dec. 2, 2020, 11 pages.

Xie, et al., "Use of BIER Entropy for Data Center Clos Networks," draft-ietf-bier-entropy-staged-dc-clos-04, Network Working Group, Internet-Draft, Oct. 27, 2020, 11 pages.

\* cited by examiner

MANAGEMENT FRAMEWORK FOR BIER IN-BAND TRAFFIC ACCOUNTING AND PATH MONITORING

TECHNICAL FIELD

[ow] The present disclosure relates generally to Bit Index Explicit Replication (BIER) networks.

BACKGROUND

The BIER Request for Comments (RFC) 8279 for Multicast Using Bit Index Explicit Replication (BIER) defines an architecture for the forwarding of multicast data packets according to BIER procedures. The BIER procedures encapsulate multicast traffic flows (i.e., multicast flows) with a BIER header defined in the RFC. The BIER header encodes a bitstring in the BIER header to identify egress routers of a BIER network. Routers of the BIER network forward the multicast flows toward the egress routers based on the bitstring. The BIER header does not include per-flow state information, and the routers do not generate or maintain per-flow state information when acting in accordance with the BIER procedures defined in the RFC. In the absence of per-router, per-flow state information, monitoring and tracing of the multicast flows in the BIER network for accounting purposes is difficult.

DESCRIPTION OF EXAMPLE EMBODIMENTS

Overview

In an embodiment, a method is performed at a router configured to perform Bit Index Explicit Replication (BIER) forwarding of multicast packets in a network. The router may be an ingress router of the network. The method includes, upon receiving a multicast packet of a multicast flow, accessing flow mappings in which multicast flows are mapped to fixed accounting values corresponding to the multicast flows. The method further comprises generating a BIER header for the multicast packet by encoding a multi-segment entropy field of the BIER header with (i) a variable entropy value for equal-cost multi-path (ECMP) load balancing, and (ii) a fixed accounting value among the fixed accounting values that is mapped to the multicast flow in the flow mappings. The method also includes encapsulating the multicast packet with the BIER header to produce a BIER packet, and forwarding the BIER packet.

In another embodiment, a method is performed at a router configured to perform BIER forwarding of multicast packets in a network. The router may be a transit router of the network. The method includes receiving a multicast packet encapsulated with a BIER header including a multi-segment entropy field. The multi-segment entropy field is encoded with (i) an entropy value for ECMP forwarding, and (ii) a fixed accounting value that is mapped to a multicast flow to which the multicast packet belongs. The method also includes retrieving the fixed accounting value from the multi-segment entropy field, and sending, to a network controller, a message including an identifier of the router and the fixed accounting value, to enable the network controller to trace a network path of the multicast flow. The method further includes forwarding the multicast packet encapsulated with the BIER header.

EXAMPLE EMBODIMENTS

As mentioned above, limitations of existing (i.e., conventional) BIER procedures make it difficult to monitor multicast flows in a BIER network. Existing BIER procedures and their shorting comings are described below in connection with FIGS. 1-3. Embodiments presented herein provide extended or enhanced BIER procedures to overcome such limitations. The extended BIER procedures support a network configuration management (NCM) framework for BIER traffic accounting and service level agreement (SLA) monitoring. The extended BIER procedures are presented below in connection with FIGS. 4-8.

Figure 1:
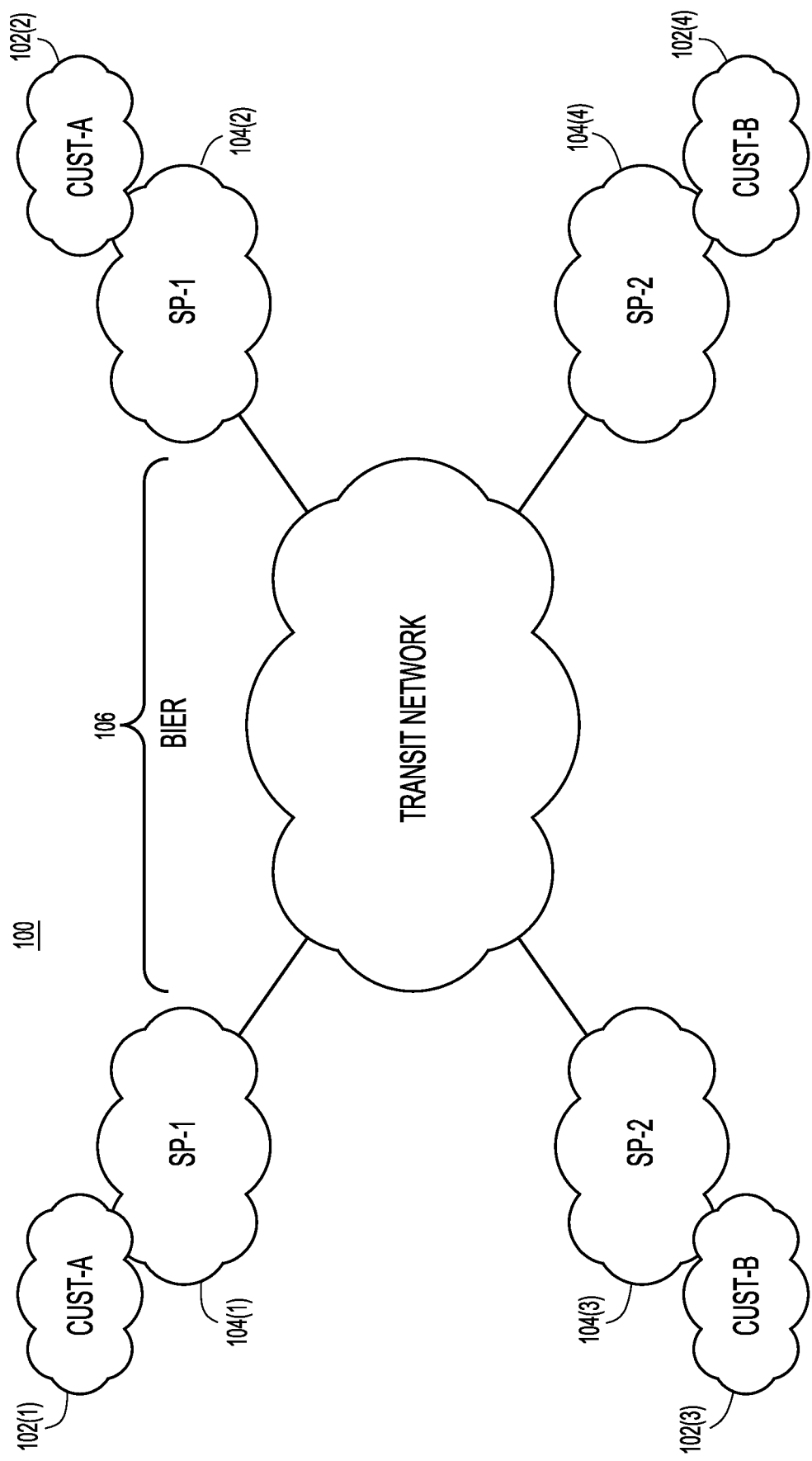
FIG. 1 is a block diagram of a network environment that includes a BIER network for forwarding multicast traffic using either existing (i.e., conventional) BIER procedures, or extended/new BIER procedures presented herein, according to an embodiment.

Referring first to FIG. 1, there is a block diagram of an example network environment 100 in which multicast flow monitoring/accounting is useful to network operators. Network environment 100 includes customer (Cust) networks 102(1)-102(4) (collectively referred to as customer networks 102), service provider (SP) networks 104(1)-104(4) (collectively referred to as SP networks 104) connected to the customer networks, and a BIER network 106 (also referred to as a transit network) connected to the SP networks. SP networks 104 provide customer networks 102 with access to BIER network 106. Customer A operates customer networks 102(1) and 102(2), customer B operates customer networks 102(3) and 102(4), service provider SP-1 operates SP networks 104(1) and 104(2), and service provider SP-2 operates SP networks 104(3) and 104(4). Customer networks 102 may include local area networks (LANs) segmented into virtual private networks (VPNs), for example. In addition, BIER network 106 may be associated with one or more LANs and one or more wide area networks (WANs), such as the Internet.

Customer networks 102 communicate with each other over BIER network 106. That is, customer networks 102 send traffic to each other over BIER network 106. In an example, client/customer equipment connected to customer networks 102 originate multicast traffic (e.g., flows of IP multicast packets), and BIER network 106 forwards the multicast traffic (also referred to as both multicast flows and BIER traffic) between the customer networks in accordance with BIER procedures. The multicast flows may or may not be associated with various VPNs. Ideally, BIER network 106 provides multicast flow accounting information to satisfy a wide range of SLA requirements. For example, such information may be used to perform accounting for the multicast flows forwarded by the BIER network from end-to-end, i.e., from ingress/egress of the multicast flows to/from the BIER network. Such accounting may include performing accounting for billing on a per-router, per-flow, and per-VPN basis, recording/tracing an end-to-end path taken per-flow, and recording timing jitter and end-to-end latency per-flow. Also, some use cases benefit from monitoring a set of multicast flows, where the set of multicast flows originate from an ingress router of BIER network 106.

Disadvantageously, when BIER network 106 operates according to existing BIER procedures as defined in the RFC, the BIER network does not generate the above-mentioned accounting information when forwarding multicast flows. One reason for this is that an existing BIER header (defined in the RFC), used to forward multicast packets encapsulated with the existing BIER header, does not include or record per-flow state information. Moreover, to save time, transit routers in the BIER network do not parse multicast packets beyond the existing BIER header, and thus do not discover multicast flow state information. Such shortcomings are described more fully below in connection with FIG. 2.

Figure 2:
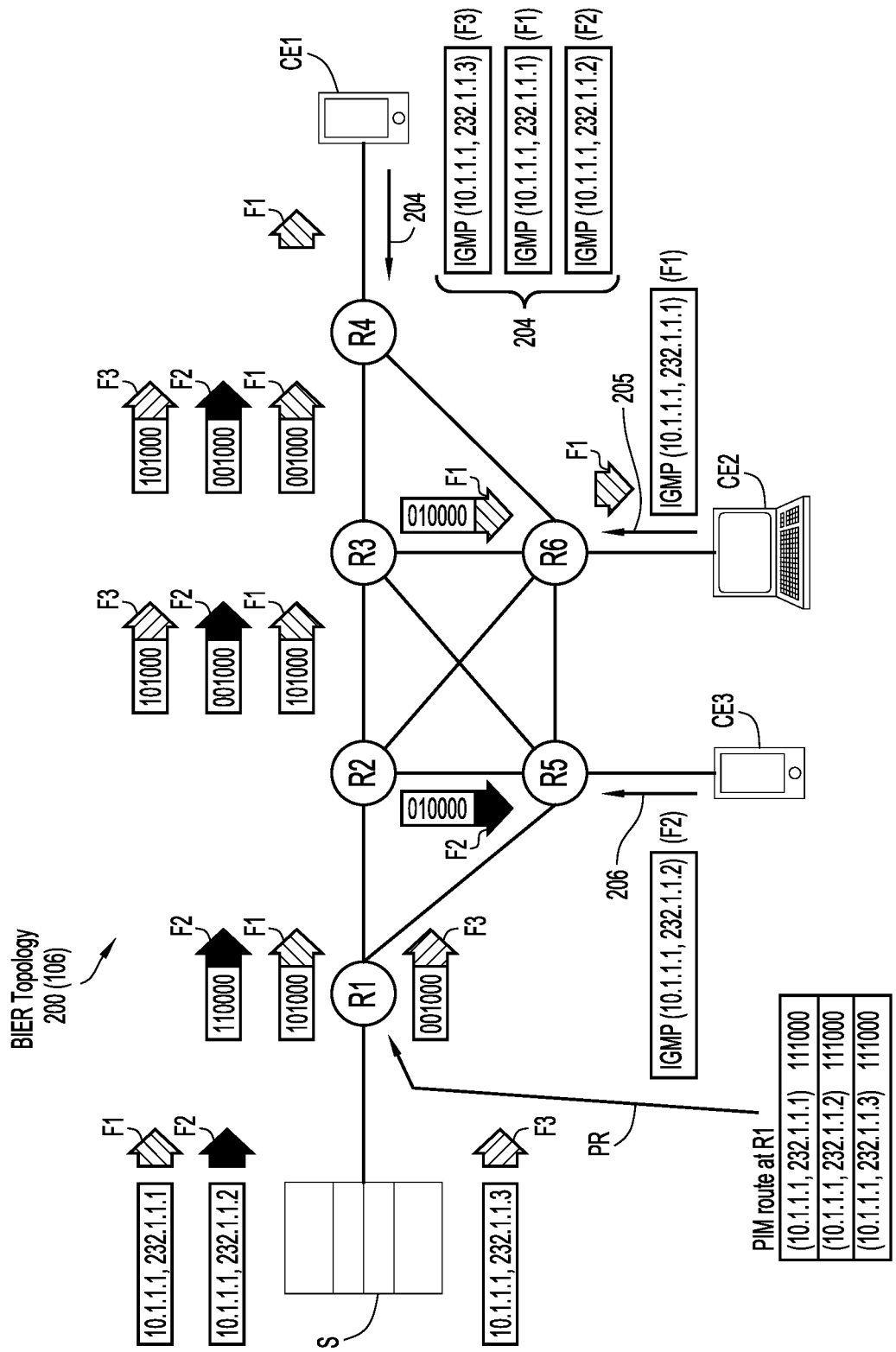
FIG. 2 is a block diagram of a BIER topology/network configured to forward multicast traffic using existing BIER procedures.

With reference to FIG. 2, there is a block diagram of an example BIER topology 200 (also referred to as a BIER network 200) corresponding to BIER network 106. Bier Topology 200 is useful for describing the existing BIER procedures for forwarding multicast flows in a BIER domain. BIER topology 200 includes BIER routers R1-R6 connected to each other over various network links, as shown. More generally, routers R1-R6 represent network devices or nodes, such as routers, switches, and the like, that may be implemented in hardware or virtually, e.g., as network device applications hosted on servers. A source S of multicast traffic is connected to router R1, and customer equipment CE1, CE2, and CE3 (or multicast receivers CE1-CE3 of multicast traffic) are connected to routers R4, R6, and R5, respectively. Source S and multicast receivers CE1-CE3 represent external equipment, such as user equipment or client devices connected to customer networks 102, described above. Routers R1 and R4-R6 are also referred to as "edge" routers because they sit at the edge of BIER topology 200 and connect to the external equipment (e.g., source S and each receiver CEi) as shown. Generally, source S originates multicast flows of IP multicast packets destined for receivers CE1-CE3, and sends the multicast flows to router R1. Acting as a source or ingress router for BIER topology 200, router R1 forwards the multicast flows to routers R4, R5, and R6, which act as egress routers for the BIER topology to forward the multicast flows to receivers CE1, CE3, and CE2, respectively. Routers R2 and R3 are transit or intermediate routers that are neither ingress nor egress routers.

Routers R1-R6 are each configured or provisioned with BIER information including, but not limited to: a bit-forwarding router (BFR)-prefix (PFX) (BFR-PFX), which identifies the router in the BIER topology/network; a local range that is allocated to the router so that the router can perform forwarding of traffic using BIER over Multiprotocol Label Switching (MPLS), for example; a unique BFR-Identifier (ID) (BFR-ID) that is assigned to the router; and a BIER subdomain list that identifies BIER subdomains of a BIER domain on which the router can send and receive traffic.

Prior to routing of multicast flows through BIER topology 200, routers R1-R6 perform Border Gateway Protocol (BGP) auto-discovery (A-D) among themselves, for example. During BGP auto-discovery, routers R4-R6 send to source/ingress router R1 BGP messages that carry respective Inclusive (I)-Provider Multicast Service Interface (PMSI) (I-PMSI) information (e.g., respective routes) for the sending routers R4-R6 (i.e., the "sending" here means originating and sending of BGP messages). After auto-discovery, routers R4, R5, and R6 receive from their connected customer equipment respective multicast group membership joins (e.g., Internet Group Management Protocol (IGMP) membership joins) 204, 206, and 205, and forward their respective membership joins to router R1. Each membership join includes a pair or tuple (source address (S), group address (G)) identifying a multicast flow, for example.

Based on the membership joins, R4-R6 express interest in receiving the following multicast flows:
 a. R4 expresses interest in receiving three multicast flows F1=(S1, G1), F2=(S1, G2), and F3=(S1, G3), where S1=10.1.1.1, G1=232.1.1.1, G2=232.1.1.2, and G3=232.1.1.3.
 b. R5 expresses interest in receiving only multicast flow F2.
 c. R6 expresses interest in receiving only multicast flow F1.

Auto-discovery establishes protocol independent multicast (PIM) routes PR at ingress router R1. After auto-discovery, ingress router R1 receives multicast packets (e.g., IP multicast packets) for each of multicast flows F1-F3. The multicast packets include (S, G) tuples to identify the multicast flows to which they belong. Ingress router R1 encapsulates each multicast packet with an existing BIER header encoded with an initial forwarding bitstring (e.g., 101000 for flow F1, 110000 for flow F2, and 001000 for flow F3) to produce an encapsulated multicast packet (also referred to as a BIER packet). The forwarding bitstring (referred to simply as the "bitstring") in the existing BIER header identifies all of the egress routers that expressed interest in receiving the multicast flow to which the multicast packet belongs. Ingress router R1 forwards the BIER packets to one or more of next hop transit routers R2 and R3 for subsequent forwarding of the BIER packets to each of egress routers R4-R6 interested in receiving the BIER packets.

Upon receiving each BIER packet, transit routers R2 and R3 perform replication and forwarding of the BIER packet toward egress routers R4-R6 based only on the bitstring in the existing BIER header. That is, transit routers R2 and R3 do not look/parse beyond the existing BIER header to perform the forwarding. As a result, transit routers R2 and R3 do not access either (i) per-flow state information (e.g., tuple (S, G)) in the multicast packet identifying the multicast flow to which the multicast packet belongs, or (ii) VPN information, e.g., a VPN label, identifying the VPN associated with the multicast flow. When egress routers R4-R6 receive the BIER packet, the egress routers decapsulate the BIER packet to recover its payload, i.e., the multicast packet, and forward the multicast packet to the receivers connected to the egress routers.

Figure 3:
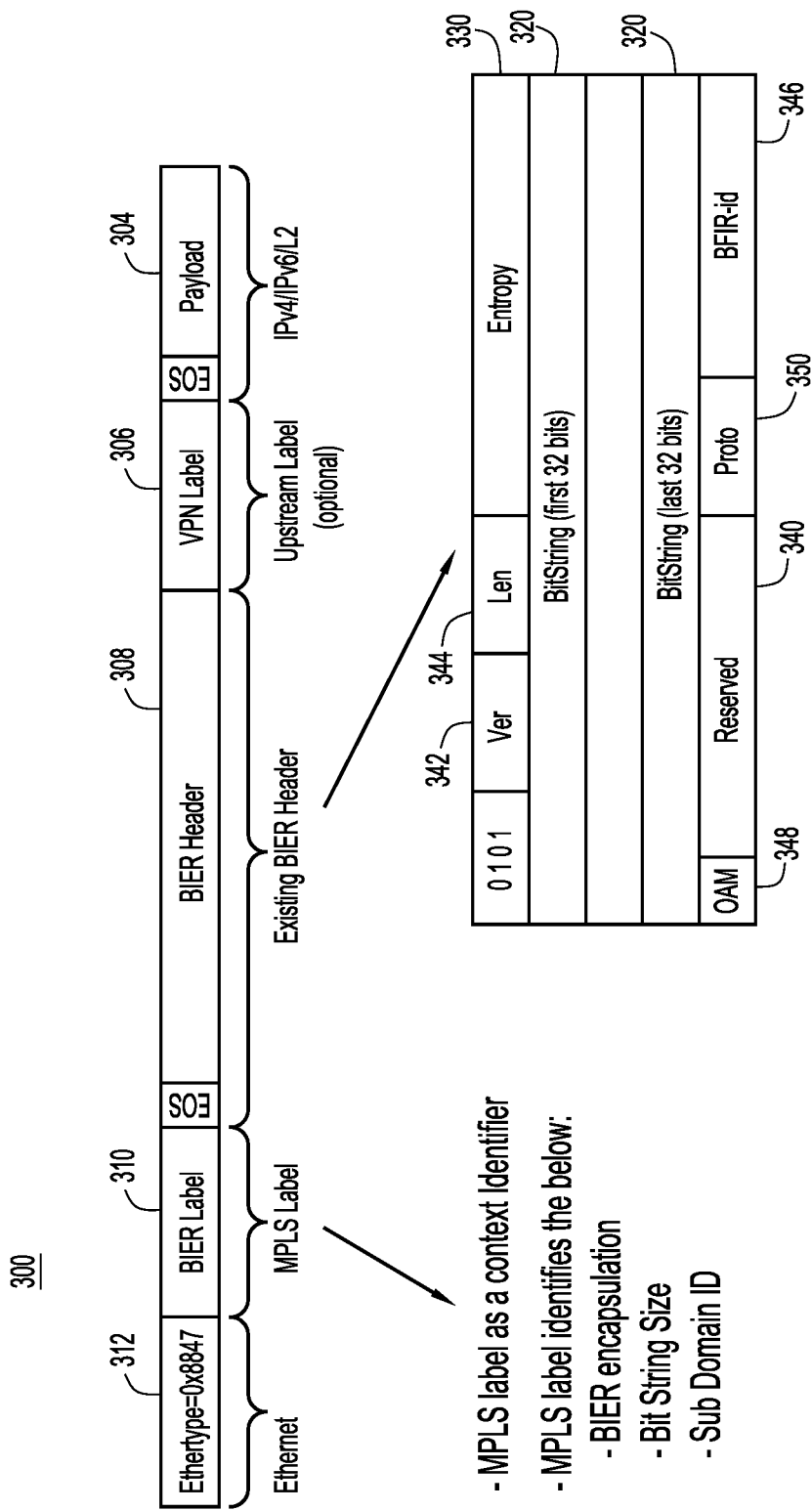
FIG. 3 is an illustration of an existing BIER packet with Multiprotocol Label Switching (MPLS) encapsulation.

With reference to FIG. 3, there is a diagram of an example BIER packet 300 with MPLS encapsulation. BIER packet 300 includes a payload 304, which may be an IP multicast packet that includes an (S, G) tuple (not shown) identifying a multicast flow. BIER packet 300 further includes: an optional VPN label 306 encapsulating the payload and identifying a VPN associated with the multicast flow (S, G); an existing BIER header 308 encapsulating the payload and optional VPN label; a BIER or MPLS label 310; and an Ethernet header 312 encapsulating all of the previously listed fields. In some examples, the combination of only payload 304, optional VPN label 306, and existing BIER header 308 may be referred to as the BIER packet.

As shown in an expanded view in FIG. 3, existing BIER header 308 includes a bitstring field 320 encoded with the bitstring, described above. Each bit in the bitstring represents exactly one of the egress routers of a BIER domain; thus, to ensure forwarding of the multicast packet to a set of egress routers (e.g., routers R4-R6), an ingress router (e.g., router R1) sets the bits of the bitstring corresponding to those routers. Existing BIER header 308 also includes an entropy field 330 (e.g., of 16-18 bits) that is encoded with an entropy value. Routers in the BIER domain employ an entropy technique that uses the entropy value to achieve load balancing over equal-cost multi-path (ECMP) forwarding paths. This is referred to as equal-cost or ECMP load balancing. Each router may update the entropy value in the BIER header with hash values as the BIER packet is forwarded hop-to-hop. Thus, the entropy value may vary as the multicast packet is forwarded through the BIER domain.

Existing BIER header 308 also includes an unused reserved field 340, a version field 342, a length field 344, a BFR-ID 346, an operations, administration, and maintenance (OAM) field 348, and a next protocol (Proto) field 350 encoded with respective values as defined in the existing BIER procedures.

The embodiments presented herein introduce extended BIER procedures that extend the existing BIER procedures to overcome the limitations described above and provide numerous other advantages. The extended BIER procedures define an extended or "new" BIER header described below in connection with FIG. 4. The new BIER header facilitates monitoring of multicast flows by routers in the BIER domain, without the need for deep packet inspection of BIER packets traversing the routers. The new BIER header reuses some of the fields of the existing BIER header, but does not change the extent or size of the fields, and maintains existing functionality associated with all of the fields of the existing BIER header. Thus, the changes manifested in the new BIER header minimize the need for network management upgrades. In the ensuing description, the new BIER header is described in connection with FIG. 4, and extended BIER procedures that use the new BIER header are described in connection with FIG. 5-8.

As used herein, the terms "encode" and "include" and their respective derivations may be considered synonymous and equivalent. For example, a field "encoded" with a value means the same as the value being "included" in the field, and that the field "includes" the value. Similarly, "encoding" a value in a field means the same as "including" or "populating" the value in the field, and so on.

Figure 4:
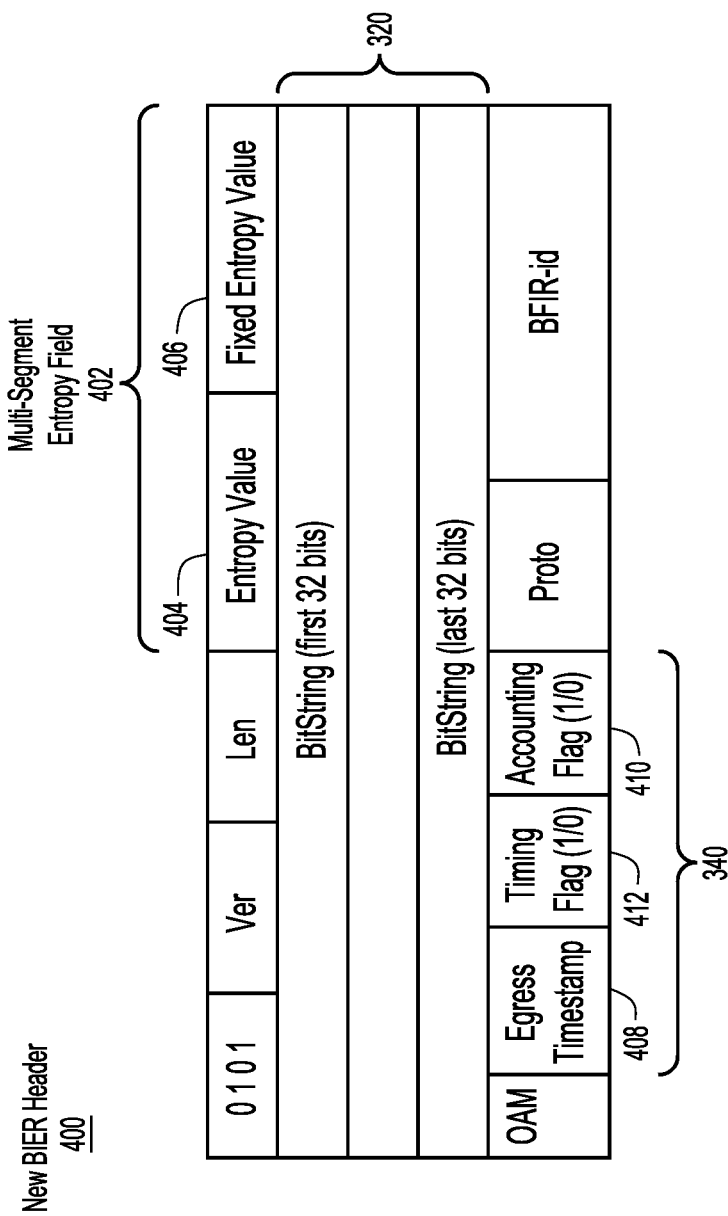
FIG. 4 is an illustration of a new BIER header used with the extended BIER procedures, according to an embodiment.

With reference to FIG. 4, there is an illustration of a new BIER header 400, according to an embodiment. New BIER header 400 optionally modifies the entropy field of existing BIER header 308. More specifically, new BIER header 400 optionally includes a multi-segment entropy field 402 encoded with multi-segment values by an ingress router of the BIER domain. More specifically, multi-segment entropy field 402 includes a first segment 404 encoded with a shortened, variable entropy value used for ECMP load balancing, and a second segment 406 encoded with a fixed entropy value (also referred to as a "fixed accounting value" or, more simply, a "fixed value") used for multicast flow accounting. While the shortened entropy value may change at each router when a multicast packet encapsulated with new BIER header 400 is forwarded in the BIER domain, the fixed value remains fixed or constant at each router. The shortened entropy value and the fixed value may each be a respective 8-bit integer value, for example. In a first example, the fixed value represents or identifies a multicast flow that is mapped to the fixed value. As such, the fixed value represents an abbreviated multicast flow identifier (ID) that is not a typical (S, G) tuple/ID for the multicast flow in the IP domain. In a second example, the fixed value represents or identifies a VPN to which one or more multicast flows belong. As such, the fixed value represents an abbreviated VPN ID that is not a typical VPN ID. Alternatively, the fixed value may be a typical VPN ID. Use of multi-segment entropy field 402 is optional. That is, in some embodiments, new BIER header 400 may simply retain entropy field 330 of existing BIER header 308.

New BIER header 400 also makes use of reserved field 340 of the existing BIER header. More specifically, in new BIER header 400, reserved field 340 includes a timestamp field 408 encoded with an egress timestamp by an ingress router to indicate a time when forwarding of a multicast packet encapsulated with the new BIER header from the ingress router occurs, an accounting flag 410 set by the ingress router to indicate whether multi-segment entropy field 402 includes the fixed value (e.g., the multicast flow ID or the VPN ID), and a timing (or timestamp) flag 412 set by the ingress router to indicate whether timestamp field 408 includes the egress timestamp. The egress timestamp corresponds to when the egress router forwards a BIER packet with the new BIER header 400 to a next hop router. Once the ingress router has forwarded a BIER packet including new BIER header 400, the fixed value, the egress timestamp, and flags 410 and 412 remain unchanged or fixed at each next hop router. Encoding of egress timestamp field 408 with the egress timestamp is optional.

For accounting flag 410, in an example, a value=1 may indicate that multi-segment entropy field 402 includes the fixed value (e.g., multicast flow ID or VPN ID), and that routers at each hop are to perform multicast flow accounting based on the fixed value, and report their accounting results. Alternatively, a value=0 may indicate that multi-segment entropy field 402 does not include the fixed value (i.e., that the new BIER header includes existing entropy field 330), and that multicast flow accounting at each hop is not to be performed. For timing flag 412, in an example, a value=1 may indicate that timestamp field 408 includes an egress timestamp and that routers at each hop are to perform packet timing operations using the egress timestamp, and report timing results. Alternatively, a value=0 may indicate that timestamp field 408 does not include the egress timestamp and that routers at each hop do not perform the packet timing operations using an egress timestamp set by the ingress router.

Figure 5:
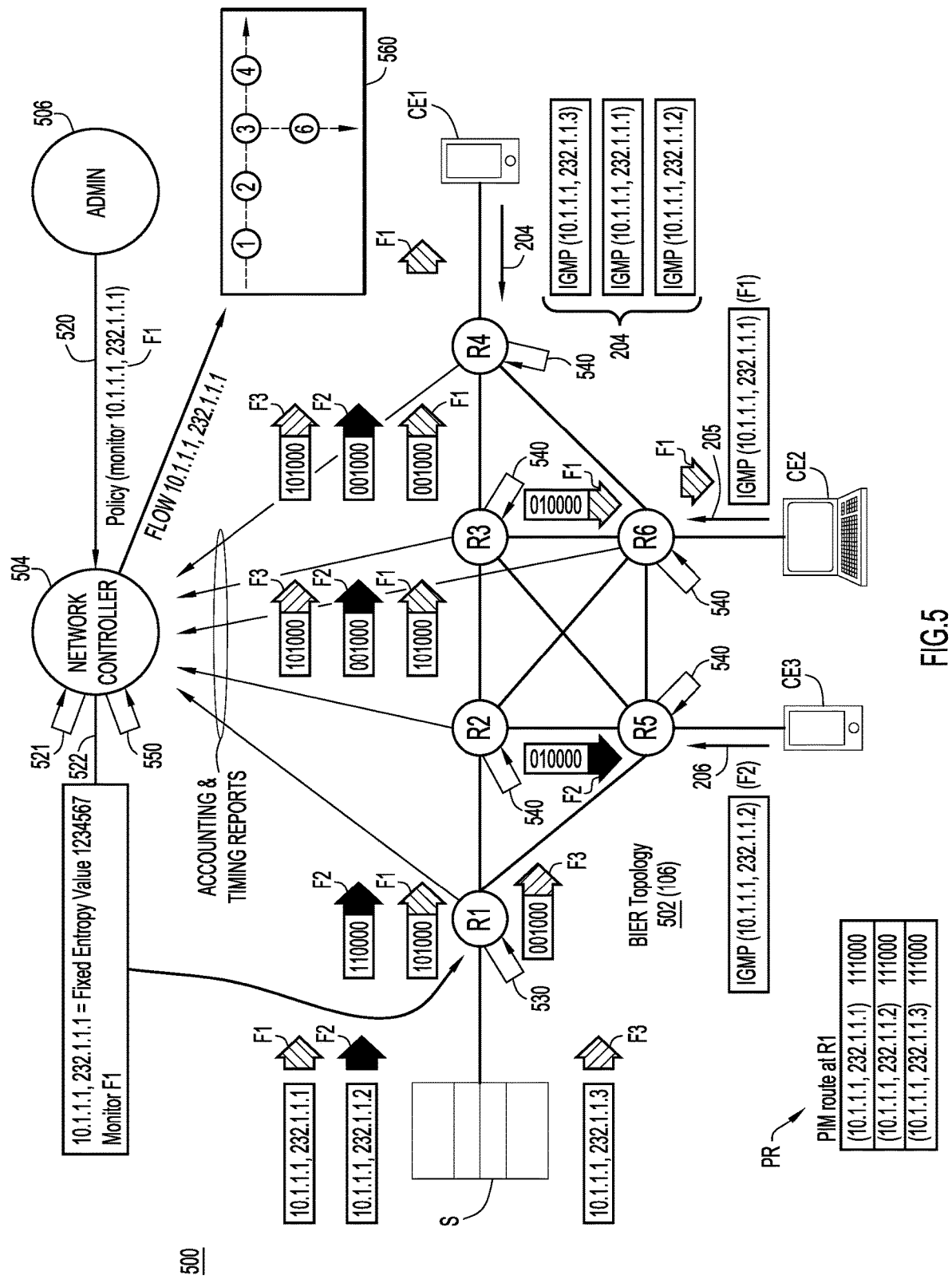
FIG. 5 is a block diagram of a network system configured to forward multicast traffic using the extended BIER procedures and the new BIER header, according to an embodiment.

With reference to FIG. 5, there is a block diagram of a network system 500 useful for describing the extended BIER procedures that use new BIER header 400. Network system 500 includes BIER topology 502, a network controller 504 to communicate with and control routers of the BIER topology, and an administrator application 506 (also referred to simply as an administrator) to communicate with the network controller. BIER topology 502 is configured similarly to BIER topology 200, except that BIER topology 502 is configured to operate in accordance with the extended BIER procedures described below.

At 520, administrator 506 provides an instruction to network controller 504 to perform SLA monitoring of one or more multicast flows. Also, administrator 506 may instruct network controller 504 to monitor all multicast flows under each of one or more VPNs. In the example of FIG. 5, administrator 506 instructs network controller 504 to monitor multicast flow (S, G)=(10.1.1.1, 232.1.1.1) corresponding to multicast flow F1.

Upon receiving the instruction(s) from administrator 506, at 521, network controller 504 may assign a unique fixed value to each of the multicast flows. For example, for purposes of monitoring multiple first multicast flows belonging to a first VPN, multiple second multicast flows belonging to a second VPN, and so on, network controller 504 may assign a first fixed value (e.g., the same fixed value) to each of the first multicast flows (i.e., the first fixed value is the same across the first multicast flows) belonging to the first VPN, a second fixed value different from the first fixed value to each of the second multicast flows belonging to the second VPN, and so on. Network controller 504 generates and stores flow mappings of the multicast flows (i.e., their identifiers) to their corresponding/assigned fixed values, and to the VPNs to which the multicast flows belong, when applicable. In the example of FIG. 5, network controller 504 simply assigns a unique fixed value 1234567 to multicast flow F1, and stores a mapping of an identifier of multicast flow F1 (e.g., the (S, G) tuple for multicast flow F1) to the fixed value 1234567 assigned/corresponding to that multicast flow. Network controller 504 may use any technique to generate the fixed values to be assigned to multicast flows. For example, network controller may generate the fixed values as random numbers, or access a predetermined set of the fixed values. In the case of assigning the fixed value to a VPN, the fixed value may or may not be the VPN ID.

At 522, network controller 504 sends to ingress router R1 a message that informs the ingress router that SLA monitoring (e.g., flow accounting) is to be performed for multicast flow F1. The message includes the mapping of multicast flow F1 (e.g. its (S, G) tuple) to fixed value 1234567. In another embodiment, ingress router R1 may receive the instruction(s) to monitor multicast flows (e.g., multicast flow F1) directly from network controller 504, without a corresponding mapping, in which case the ingress router generates the fixed value(s) and establishes the multicast flow-to-fixed value(s) mapping(s) described above.

Router R1 receives the message from network controller 504, and receives multicast flows F1-F3 from source S. Based on the message from network controller 504, at 530, router R1 performs the following operations for each multicast packet in multicast flow F1. Router R1 generates a new BIER header (e.g., new BIER header 400) for the multicast packet, and encodes the appropriate forwarding bitstring into field 320 of the new BIER header. Router R1 also encodes the fixed value 1234567 mapped to multicast flow F1 into second segment 406 of multi-segment entropy field 402 of the new BIER header, and sets accounting flag 410 to a value (e.g., 1) that indicates that the new BIER header includes the fixed value, in order to trigger next hop routers to perform flow accounting for multicast flow F1.

Router R1 also encodes first segment 404 with a shortened entropy value to be used for ECMP load balancing.

When router R1 encapsulates the multicast packet with the new BIER header to produce an encapsulated multicast packet/BIER packet, the router encodes an egress timestamp into timestamp field 408 of the new BIER header, and sets timing flag 412 to a value that indicates the presence of the egress timestamp. Router R1 forwards the BIER packet to a next hop router (e.g., router R2). The egress timestamp represents a time when router R1 forwards the BIER packet to the next hop router.

Over time, router R1 generates flow monitoring information for multicast flow F1. For example, router R1 employs counters to count a number of multicast packets for multicast flow F1 that are received at the router (i.e., an ingress packet count), a number of multicast packets of the multicast flow that are forwarded by the router (i.e., an egress packet count), elapsed times that the multicast packets spend at the router (e.g., a difference between an egress time and an ingress time for each of the multicast packets), and so on. Router R1 periodically sends to network controller 504 messages or reports that each include an identifier of router R1 and the flow monitoring information. The identifier of router R1 may include a BFR-ID, an IP address, and so on. The flow monitoring information may include the ingress and egress packet counts, the elapsed times, current egress timestamps, and so on.

Router R1 processes the multicast packets of remaining multicast flows F2-F3 in accordance with the existing BIER procedures as described above in connection with FIGS. 2 and 3. This includes encapsulating the multicast packets with an existing BIER header, and forwarding the resulting BIER packets to next hop router R2.

Next hop (transit) router R2 receives the BIER packets for multicast flows F1-F3 forwarded by ingress router R1. Upon receiving the BIER packets, at 540, router R2 performs the following operations on each BIER packet. Router R2 parses the various fields of the BIER header to retrieve their values, but does not parse the BIER packet any deeper than the BIER header. Router R2 examines accounting flag 410 in the BIER header to determine whether multi-segment entropy field 402 is encoded with a fixed value. When accounting flag 410 indicates that the fixed value is present (and that the BIER header is a new BIER header instead of the existing/conventional BIER header), router R2 retrieves or accesses the fixed value from the multi-segment entropy field and generates flow monitoring information for the multicast flow associated with the fixed value. For example, similar to router R1, router R2 maintains counters to count ingress and egress packet counts for similar BIER packets that include the fixed value, and to track elapsed times that those packets spend at the router. Router R2 sends to network controller 520 one or more messages or reports that each include an identifier of router R2, the fixed value, and the monitoring information. When accounting flag 410 indicates that the fixed value is not present, router R2 does not perform the aforementioned accessing and reporting based on the fixed value.

Router R2 also examines timing flag 412 in the BIER header to determine whether the BIER header is encoded with an egress timestamp. When timing flag 412 indicates that the egress timestamp is present, next hop router R2 retrieves the egress timestamp and computes a total transit time of the BIER packet from when ingress router R1 forwarded the BIER packet to when router R2 received the BIER packet, based on the egress timestamp. For example, router R2 may compute the total transit time as a time difference between the egress timestamp and an ingress time (or an egress time) of the BIER packet at (or from) router R2. Router R2 sends to network controller 504 a message or report that includes the identifier of router R2, the egress timestamp, and the total transit time. When timestamp flag 412 indicates that the egress timestamp is not present, next hop router R2 does not perform the aforementioned total transit time computation and reporting.

In the example of FIG. 5, for multicast flow F1, accounting flag 410 indicates the presence of the fixed value 1234567, and timing flag 412 indicates the presence of the egress timestamp in the BIER header. Accordingly, accounting flag 410 and timing flag 412 trigger router R2 to perform the monitoring, transit time computing, and reporting operations described above on the BIER packets of multicast flow F1. The messages or reports sent by router R2 to network controller 504 each include the identifier of router R2 and the fixed value 1234567 that specifically associates the information in the reports with multicast flow F1. In contrast, for multicast flows F2 and F3, accounting flag 410 indicates the BIER header is not encoded with a fixed value, and timing flag 412 indicates the BIER header is not encoded with the egress timestamp. Accordingly, for multicast flows F2 and F3, router R2 does not perform the monitoring, transit time computing, and reporting described above for multicast flows F1.

After performing the operations described above, router R2 forwards the BIER packets for multicast flows F1-F3 to their next hop destinations based on the bitstrings in the BIER headers of the BIER packets. For example, router R2 forwards the BIER packets to transit router R3, egress router R5, and so on. Operations 540 described above with respect to router R2 are repeated at each next hop transit router (e.g., router R3) traversed by the BIER packets of multicast flows F1-F3, until the BIER packets are forwarded to the egress routers, which decapsulate the BIER packets and forward the payloads (e.g., IP multicast packets) to the customer equipment. In an embodiment, the egress routers may each also perform operations 540 prior to decapsulating the BIER headers.

Network controller 504 receives the above-mentioned reports sent by the routers of BIER topology 502 and, at 550, performs the following operations based on the reports. Network controller 504 accesses the fixed value (e.g., 1234567) included in the reports, and determines that the fixed value is mapped to multicast flow F1 based on the fixed value-to-multicast flow mapping (i.e., the flow mapping) previously established by network controller at operation 521. Based on the flow mapping, network controller 504 associates the information in the reports (that carry the fixed value) with multicast flow F1. For multicast flow F1, network controller 504 generates an accounting report based on the information in the reports.

For example, network controller 504 may tabulate or compute a total number of multicast packets handled at each router, elapsed times at each router, total transit times from ingress router R1 to each other router, an end-to-end transit time, and so on, and include those results in the report. Network controller 504 may also compute timing jitter and latency per-flow (e.g., for multicast flow F1), bits per second (bps) per-flow, and total traffic in bytes per-flow.

Network controller 504 may also generate a trace 560 of multicast flow F1 through BIER topology 502 based on the information (e.g., router identifiers) in the reports. Trace 560 defines a path (which may be represented in tree form) taken by multicast flow F1 through BIER topology 502. The path identifies each hop (e.g., router) of BIER topology 502 traversed by multicast packets of multicast flow F1.

Figure 6:
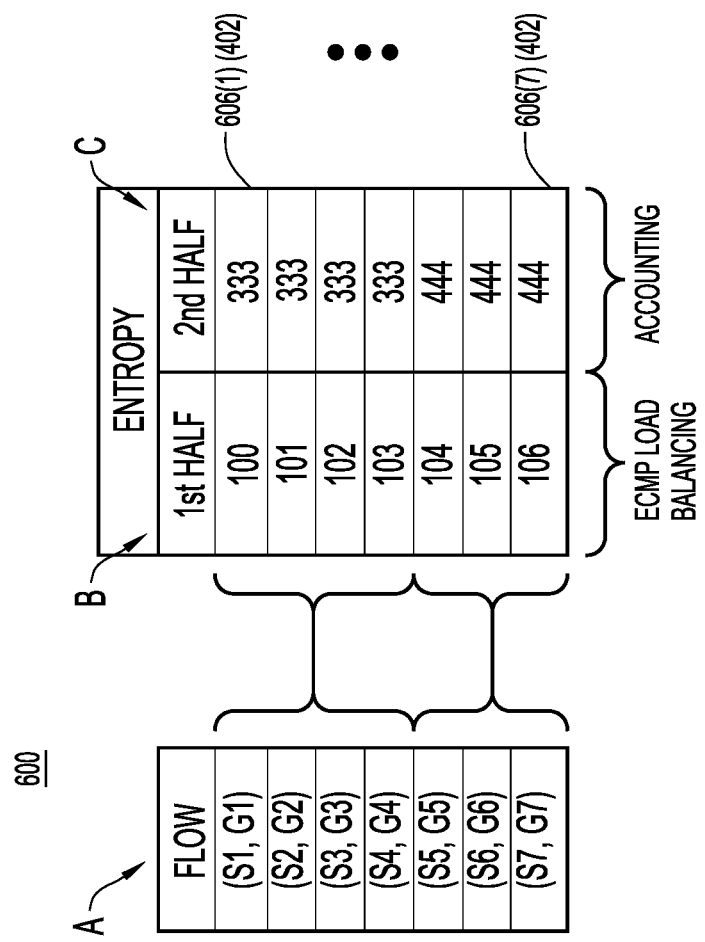
FIG. 6 shows a table of flow mappings configured to map multiple multicast flows to (shortened entropy value, fixed value) tuples of multiple multi-segment entropy fields of the new BIER header, according to an embodiment.

With reference to FIG. 6, there is shown a table 600 of example flow mappings in which multiple multicast flows (S1, G1)-(S7, G7) (i.e., identifiers of the multicast flows) are mapped to tuples (shortened entropy value, fixed accounting value) of multiple multi-segment entropy fields 606(1)-606(7) (each corresponding to multi-segment entropy field 402). The flow mappings may be established by network controller 504 or ingress router R1 based on requests from administrator 506, as described above. Multi-segment entropy fields 606(1)-606(7) may be encoded into new BIER header 400 of respective BIER packets, as described above.

In the example of FIG. 6, table 600 includes columns A-C. Column A includes entries or rows identifying multicast flows (S1, G1)-(S7, G7). Column B includes short entropy values for ECMP load balancing (e.g., 100, 101, 102, and so on) corresponding/assigned to the multicast flows (e.g., (S1, G1), (S2, G2), (S3, G3), and so on). The short entropy values are to be encoded into first segment 404 (referred to as the $1^{st}$ half) of multi-segment entropy field 402 of new BIER header 400. Column C includes fixed accounting values (e.g., 333 or 444) corresponding/assigned to the multicast flows. The fixed accounting values are to be encoded into second segment 406 (referred to as the $2^{nd}$ half) of multi-segment entropy field 402. In the example of FIG. 6, the multicast flows of column A are divided into two distinct sets or groups of multicast flows including a first set of multicast flows (S1, G1)-(S4, G4) and a second set of multicast flows (S5, G5)-(S7, G7). The first and second sets of multicast flows are mapped to distinct fixed values 333 and 444, respectively. In an example, fixed values 333 and 444 may represent, and be mapped to, distinct VPN IDs to which the multicast flows belong. In other words, the multicast flows are divided into distinct sets of multicast flows that are associated with distinct VPNs.

Figure 7:
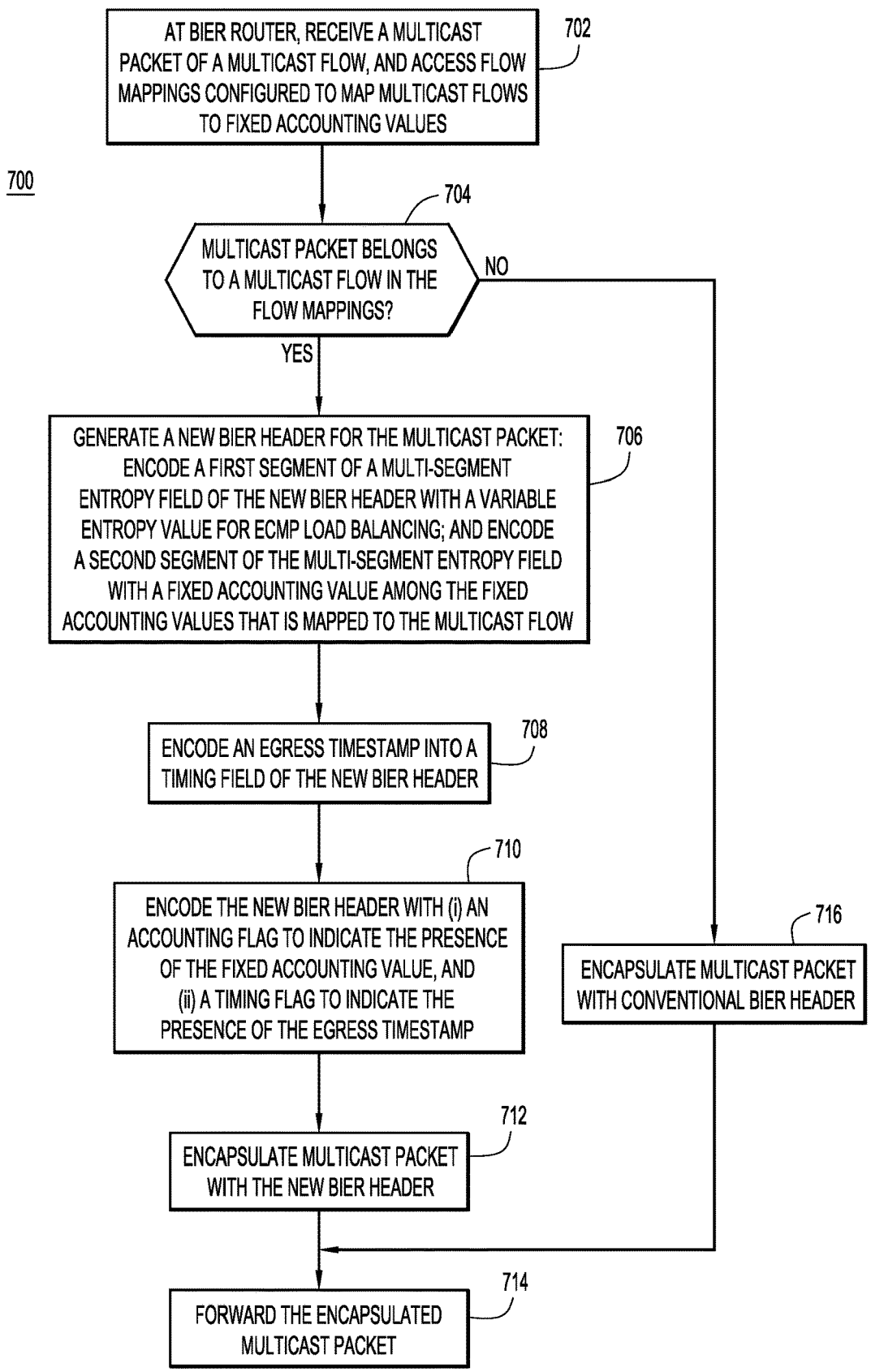
FIG. 7 is a flowchart of a method of multicast (BIER) traffic accounting and path service level agreement (SLA) monitoring performed by an ingress router in a BIER domain, according to an embodiment.

With reference to FIG. 7, there is a flowchart of an example method 700 of BIER traffic accounting and path SLA monitoring that may be performed by an ingress router in a BIER domain. Various operations of method 700 are described above.

1. At 702, the router receives a multicast packet of a multicast flow, and accesses flow mappings in which multicast flows are mapped to distinct fixed accounting values corresponding to the multicast flows. In an example, the flow mappings include (S, G) identifiers of the multicast flows that are mapped to the fixed accounting values. In an example, the fixed values are each mapped to a respective one of the multicast flows. In another example, the fixed values are each mapped to/across multiple ones of the multicast flows. The fixed accounting values may include one or more VPN identifier for VPNs that include the multicast flows. Thus, the fixed accounting values may be said to map to the multicast flows directly or indirectly (e.g., via a VPN identifier).

At 704, the router determines whether the multicast packet belongs to any of the multicast flows in the flow mappings. In an example, the determining includes matching an (S, G) identifier of the multicast packet to the (S, G) identifiers of the flow mappings. When it is determined that the multicast packet belongs to the multicast flow based on the flow mappings, flow proceeds to 706. When it is determined that the multicast packet does not belong to any of the multicast flows in the flow mappings, flow proceeds to 716.

At 706, the router generates a new BIER header for the multicast packet. The new BIER header includes a multi-segment entropy field that includes a first segment and a second segment. The router (i) encodes the first segment of the multi-segment entropy field with a variable entropy value for ECMP load balancing, and (ii) encodes the second segment of the multi-segment entropy field with a fixed accounting value among the fixed accounting values that is mapped to the multicast flow in the flow mappings. More generally, the router encodes the multi-segment entropy field with (i) the variable entropy value for ECMP load balancing/forwarding, and (ii) the fixed accounting value mapped to the multicast flow.

At 708, the router optionally encodes an egress timestamp into a timing field of the new BIER header.

At 710, the router encodes the new BIER header with (i) an accounting flag set to indicate the presence of the fixed accounting value and, when the egress timestamp is present, (ii) a timing flag set to indicate the presence of the egress timestamp in the new BIER header.

At 712, the router encodes remaining fields of the new BIER header with conventional BIER information used for BIER forwarding of multicast packets, such as a bitstring that identifies egress routers, and so on. The router encapsulates the multicast packet with the new BIER header to produce an encapsulated multicast packet (i.e., a BIER packet).

At 714, the router forwards the encapsulated multicast packet according to the existing BIER procedures.

At 716, the router encapsulates the multicast packet with a conventional BIER header (i.e., a BIER header as defined under the existing BIER procedures) to produce an encapsulated multicast packet (i.e., BIER packet). Flow then proceeds to 714 to forward the encapsulated multicast packet.

Figure 8:
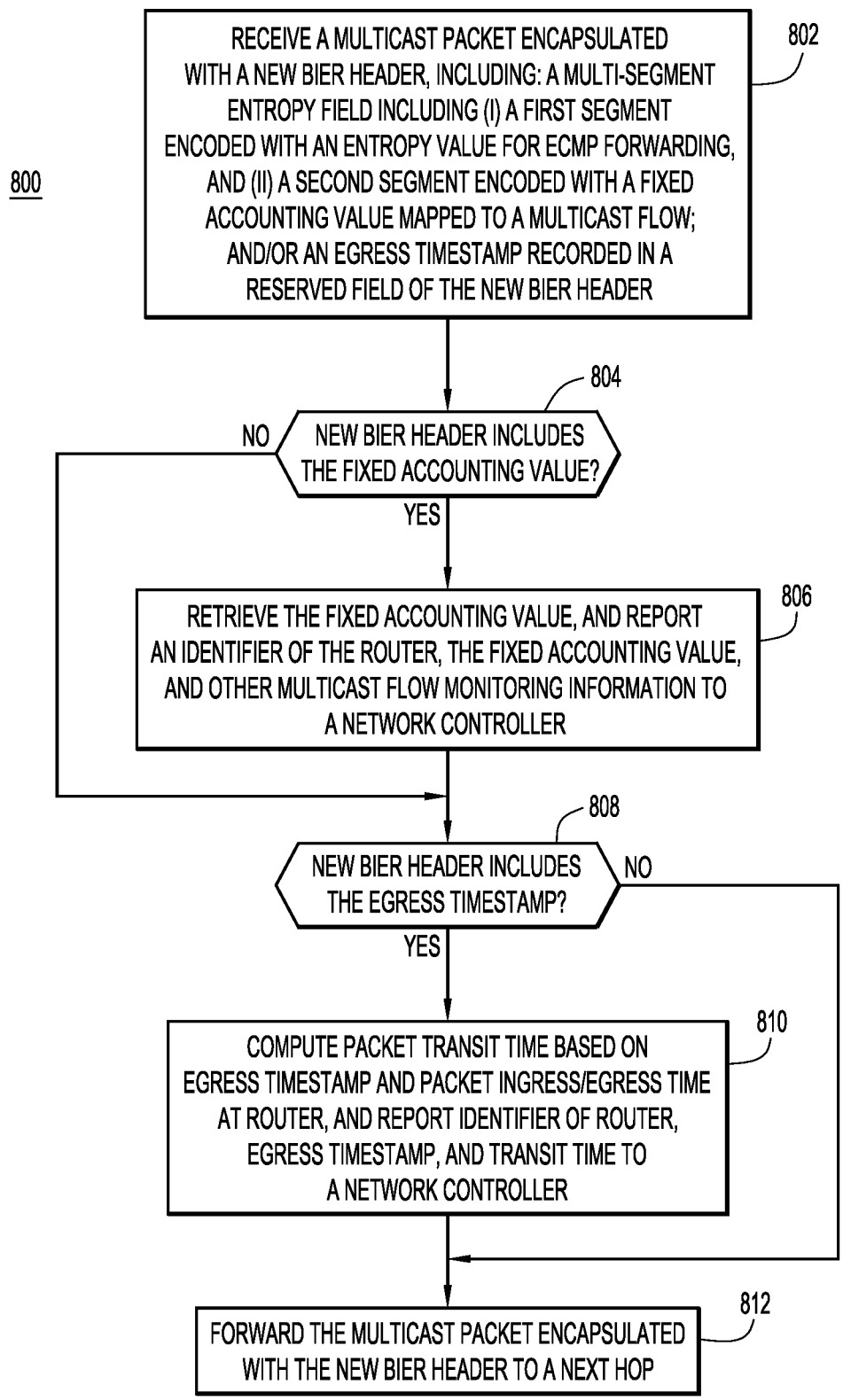
FIG. 8 is a flowchart of a method of multicast (BIER) traffic accounting and path SLA monitoring performed by a transit router or an egress router in the BIER domain, according to an embodiment.

With reference to FIG. 8, there is a flowchart of an example method 800 of BIER in-band traffic accounting and path SLA monitoring that may be performed by a transit router or an egress router in a BIER domain. Various operations of method 800 are described above.

At 802, the router receives an encapsulated multicast packet (i.e., a multicast packet encapsulated with a BIER header). In an example, the BIER header is a new BIER header. The new BIER header includes an accounting flag to indicate whether the new BIER header includes a fixed accounting value in a second segment of a multi-segment entropy field of the new BIER header. The new BIER header also includes a timing flag to indicate whether the new BIER header includes an egress timestamp that was stored in the new BIER header previously by an ingress router.

At 804, the router determines whether the new BIER header includes the fixed accounting value based on the accounting flag in the new BIER header. When the new BIER header includes the fixed accounting value, flow proceeds to 806. When the new BIER header does not include the fixed accounting value, flow proceeds to 808.

At 806, the router retrieves the fixed accounting value from the second segment of the multi-segment entropy field. The router reports, to a network controller, a message including an identifier of the router and the fixed accounting value to enable the network controller to trace a network path of the multicast flow.

At 808, the router determines whether the new BIER header includes the egress timestamp based on the timing flag in the new BIER header. When the new BIER header includes the egress timestamp, flow proceeds to 810. When the new BIER header does not include the egress timestamp, flow proceeds to 812.

At 810, the router retrieves the egress timestamp. The router computes a total transit time of the multicast packet from the ingress router to the router based on the egress timestamp and an ingress time or an egress time of the multicast packet at the router. The router sends, to a network controller, a message including the egress timestamp and the total transit time. Flow proceeds to 812.

At 812, the router retrieves an entropy value from a first segment of the multi-segment entropy field, and performs ECMP forwarding of the multicast packet encapsulated with the new BIER header based on the entropy value.

Figure 9:
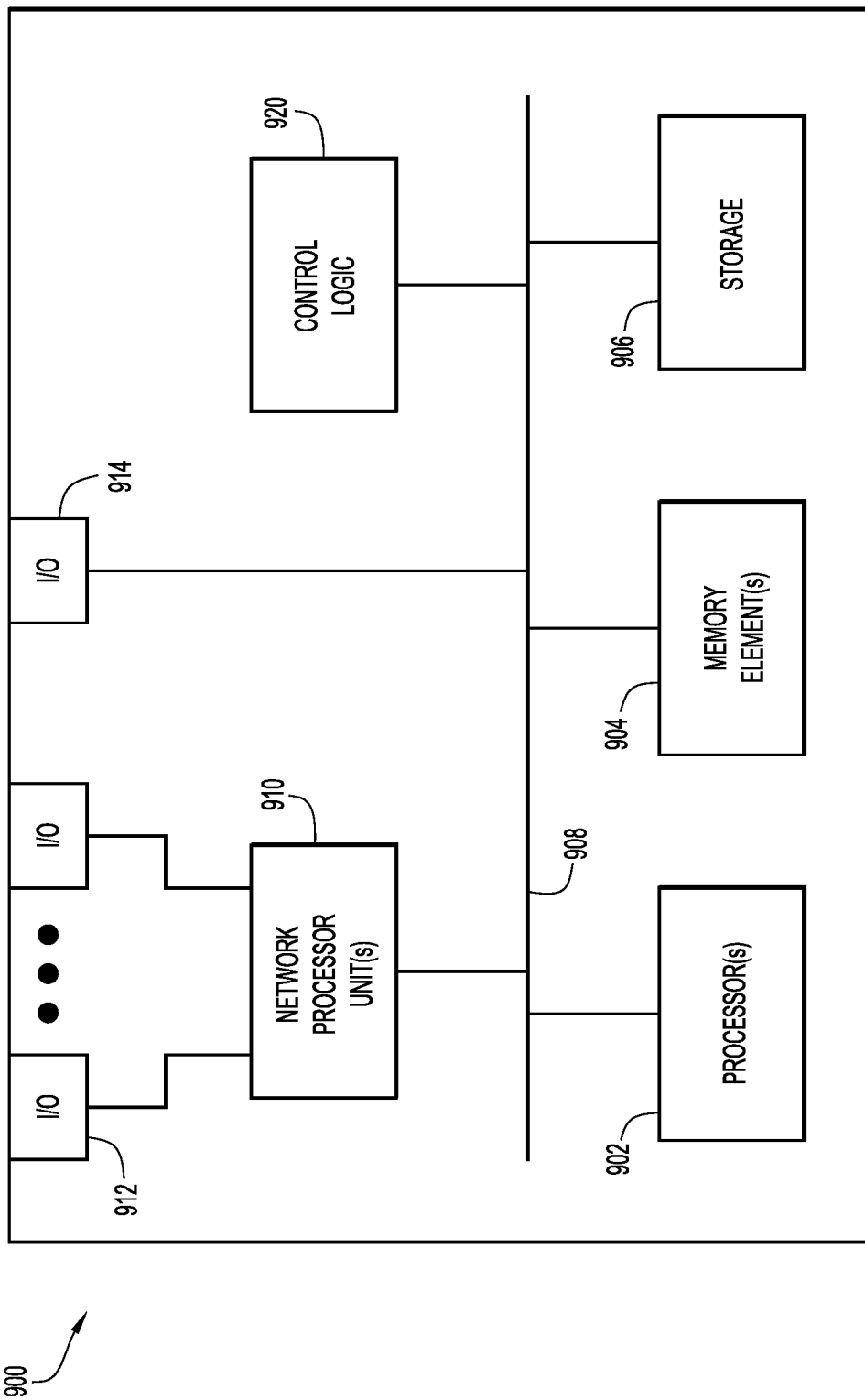
FIG. 9 is a block diagram of a network device, representative of a BIER router in a BIER network, according to an embodiment.

Referring to FIG. 9, FIG. 9 illustrates a hardware block diagram of a computing device 900 that may perform functions associated with operations discussed herein in connection with the techniques depicted in FIGS. 1-8. In various embodiments, a computing device, such as computing device 900 or any combination of computing devices 900, may be configured as any entity/entities as discussed for the techniques depicted in connection with FIGS. 1-8 in order to perform operations of the various techniques discussed herein. For example, computing device 900 may operate as a network device representative of each of routers R1-R6 that perform the existing and the extended BIER procedures, described above.

In at least one embodiment, the computing device 900 may include one or more processor(s) 902, one or more memory element(s) 904, storage 906, a bus 908, one or more network processor unit(s) 910 interconnected with one or more network input/output (I/O) interface(s) 912, one or more I/O interface(s) 914, and control logic 920. In various embodiments, instructions associated with logic for computing device 900 can overlap in any manner and are not limited to the specific allocation of instructions and/or operations described herein.

In at least one embodiment, processor(s) 902 is/are at least one hardware processor configured to execute various tasks, operations and/or functions for computing device 900 as described herein according to software and/or instructions configured for computing device 900. Processor(s) 902 (e.g., a hardware processor) can execute any type of instructions associated with data to achieve the operations detailed herein. In one example, processor(s) 902 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 904 and/or storage 906 is/are configured to store data, information, software, and/or instructions associated with computing device 900, and/or logic configured for memory element(s) 904 and/or storage 906. For example, any logic described herein (e.g., control logic 920) can, in various embodiments, be stored for computing device 900 using any combination of memory element(s) 904 and/or storage 906. Note that in some embodiments, storage 906 can be consolidated with memory element(s) 904 (or vice versa), or can overlap/exist in any other suitable manner.

In at least one embodiment, bus 908 can be configured as an interface that enables one or more elements of computing device 900 to communicate in order to exchange information and/or data. Bus 908 can be implemented with any architecture designed for passing control, data and/or information between processors, memory elements/storage, peripheral devices, and/or any other hardware and/or software components that may be configured for computing device 900. In at least one embodiment, bus 908 may be implemented as a fast kernel-hosted interconnect, potentially using shared memory between processes (e.g., logic), which can enable efficient communication paths between the processes.

In various embodiments, network processor unit(s) 910 may enable communication between computing device 900 and other systems, entities, etc., via network I/O interface(s) 912 to facilitate operations discussed for various embodiments described herein. In various embodiments, network processor unit(s) 910 can be configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 900 and other systems, entities, etc. to facilitate operations for various embodiments described herein. In various embodiments, network I/O interface(s) 912 can be configured as one or more Ethernet port(s), Fibre Channel ports, and/or any other I/O port(s) now known or hereafter developed. Thus, the network processor unit(s) 910 and/or network I/O interface(s) 912 may include suitable interfaces for receiving, transmitting, and/or otherwise communicating data and/or information in a network environment.

I/O interface(s) 914 allow for input and output of data and/or information with other entities that may be connected to computer device 900. For example, I/O interface(s) 914 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 920 can include instructions that, when executed, cause processor(s) 902 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 920) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 904 and/or storage 906 can store data, software, code, instructions (e.g., processor instructions), logic, parameters, combinations thereof, and/or the like used for operations described herein. This includes memory element(s) 904 and/or storage 906 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, BIER network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fib®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, entities for various embodiments described herein can encompass network elements (which can include virtualized network elements, functions, etc.) such as, for example, network appliances, forwarders, routers, servers, switches, gateways, bridges, loadbalancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 9 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

In summary, embodiments presented herein provide a framework for in-band traffic accounting and path SLA monitoring capability for BIER. The embodiments provide monitoring capabilities at a granularity of per-egress traffic accounting, per-flow traffic accounting, per-VPN traffic accounting, and per-flow latency.

In a first aspect, a method is provided comprising: at a router (which may be an ingress router) configured to perform Bit Index Explicit Replication (BIER) forwarding of multicast packets in a network: upon receiving a multicast packet of a multicast flow, accessing flow mappings in which multicast flows are mapped to fixed accounting values corresponding to the multicast flows; generating a BIER header for the multicast packet by encoding a multi-segment entropy field of the BIER header with (i) a variable entropy value for equal-cost multi-path (ECMP) load balancing, and (ii) a fixed accounting value among the fixed accounting values that is mapped to the multicast flow in the flow mappings; encapsulating the multicast packet with the BIER header to produce a BIER packet; and forwarding the BIER packet.

In a second aspect, an apparatus is provided comprising: multiple network input/output interfaces; and a processor of a router configured to perform Bit Index Explicit Replication (BIER) forwarding of multicast packets in a network, the processor coupled to the multiple network input/output interfaces and configured to perform: upon receiving a multicast packet of a multicast flow, accessing flow mappings in which multicast flows are mapped to fixed accounting values corresponding to the multicast flows; generating a BIER header for the multicast packet by encoding a multi-segment entropy field of the BIER header with (i) a variable entropy value for equal-cost multi-path (ECMP) load balancing, and (ii) a fixed accounting value among the fixed accounting values that is mapped to the multicast flow in the flow mappings; encapsulating the multicast packet with the BIER header to produce a BIER packet; and forwarding the BIER packet.

In a third aspect, a non-transitory computer readable medium is provided. The computer readable medium is encoded with instructions that, when executed by a processor of a router configured to perform Bit Index Explicit Replication (BIER) forwarding of multicast packets in a network, cause the router to perform: upon receiving a multicast packet of a multicast flow, accessing flow mappings in which multicast flows are mapped to fixed accounting values corresponding to the multicast flows; generating a BIER header for the multicast packet by encoding a multi-segment entropy field of the BIER header with (i) a variable entropy value for equal-cost multi-path (ECMP) load balancing, and (ii) a fixed accounting value among the fixed accounting values that is mapped to the multicast flow in the flow mappings; encapsulating the multicast packet with the BIER header to produce a BIER packet; and forwarding the BIER packet.

In a fourth aspect, a method is provided comprising: at a router (which may be a transit router) configured to perform Bit Index Explicit Replication (BIER) forwarding of multicast packets in a network: receiving a multicast packet encapsulated with a BIER header including a multi-segment entropy field encoded with (i) an entropy value for equal-cost multi-path (ECMP) forwarding, and (ii) a fixed accounting value mapped to a multicast flow to which the multicast packet belongs; retrieving the fixed accounting value from the multi-segment entropy field; sending, to a network controller, a message including an identifier of the router and the fixed accounting value to enable the network controller to trace a network path of the multicast flow; and forwarding the multicast packet encapsulated with the BIER header.

The method further comprises: retrieving the entropy value from the multi-segment entropy field, wherein the forwarding includes the ECMP forwarding of the multicast packet based on the entropy value.

The BIER header includes an accounting flag that indicates whether the BIER header includes the fixed accounting value, and the method further comprises: determining whether the BIER header includes the fixed accounting value based on the accounting flag; and when the BIER header includes the fixed accounting value, performing the retrieving and the sending.

The method further comprises: when the BIER header does not include the fixed accounting value, not performing the retrieving and the sending.

The BIER header includes a reserved field and the accounting flag is encoded in the reserved field.

The method further comprises: recording an ingress time or an egress time of the multicast packet at the router; retrieving, from the BIER header, an egress timestamp encoded in the BIER header by an ingress router of the network; computing a transit time of the multicast packet from the ingress router to the router based on the egress timestamp and the ingress time or the egress time; and sending, to the network controller, a second message including the egress timestamp and the transit time.

The BIER header includes a timing flag that indicates whether the egress timestamp is encoded in the BIER header, and the method further comprises: determining whether the BIER header includes the egress timestamp based on the timing flag; and when the BIER header includes the egress timestamp, performing the recording, the retrieving the egress timestamp, the computing, and the sending the second message.

The egress timestamp is encoded in a reserved field of the BIER header.

In a fifth aspect, an apparatus is provided comprising: multiple network input/output interfaces; and a processor of a router configured to perform Bit Index Explicit Replication (BIER) forwarding of multicast packets in a network, the processor coupled to the multiple network input/output interfaces and configured to perform: receiving a multicast packet encapsulated with a BIER header including a multi-segment entropy field encoded with (i) an entropy value for equal-cost multi-path (ECMP) forwarding, and (ii) a fixed accounting value mapped to a multicast flow to which the multicast packet belongs; retrieving the fixed accounting value from the multi-segment entropy field; sending, to a network controller, a message including an identifier of the router and the fixed accounting value to enable the network controller to trace a network path of the multicast flow; and forwarding the multicast packet encapsulated with the BIER header.

In a sixth aspect, a non-transitory computer readable medium is provided. The computer readable medium is encoded with instructions that, when executed by a processor of a router configured to perform Bit Index Explicit Replication (BIER) forwarding of multicast packets in a network, cause the router to perform: receiving a multicast packet encapsulated with a BIER header including a multi-segment entropy field encoded with (i) an entropy value for equal-cost multi-path (ECMP) forwarding, and (ii) a fixed accounting value mapped to a multicast flow to which the multicast packet belongs; retrieving the fixed accounting value from the multi-segment entropy field; sending, to a network controller, a message including an identifier of the router and the fixed accounting value to enable the network controller to trace a network path of the multicast flow; and forwarding the multicast packet encapsulated with the BIER header.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
at a router configured to perform Bit Index Explicit Replication (BIER) forwarding of multicast packets in a network:
upon receiving a multicast packet of a multicast flow, accessing flow mappings in which multicast flows are mapped to fixed accounting values corresponding to the multicast flows;
generating a BIER header for the multicast packet by encoding a multi-segment entropy field of the BIER header with (i) a first segment that includes a variable entropy value for equal-cost multi-path (ECMP) load balancing, and (ii) a second segment that includes a fixed accounting value among the fixed accounting values that is mapped to the multicast flow in the flow mappings;
encoding a reserved field of the BIER header with an accounting flag configured to indicate that the multi-segment entropy field includes the fixed accounting value, and to trigger next hop BIER routers to perform flow accounting for the multicast flow and reporting accounting results along with the fixed accounting value;
encapsulating the multicast packet with the BIER header to produce a BIER packet; and
forwarding the BIER packet.

2. The method of claim 1, further comprising, at the router:
determining whether the multicast packet belongs to any of the multicast flows in the flow mappings; and
when the multicast packet belongs to the multicast flow in the flow mappings, performing the generating.

3. The method of claim 2, wherein:
the flow mappings include (source address (S), multicast group address (G)) (S, G) identifiers of the multicast flows that are mapped to the fixed accounting values, and the multicast packet includes an (S, G) identifier of the multicast flow; and
the determining includes matching the (S, G) identifier of the multicast packet to the (S, G) identifiers of the flow mappings.

4. The method of claim 2, further comprising, at the router:
when the multicast packet does not belong to any of the multicast flows in the flow mappings, not performing the generating and the encapsulating; and
encapsulating the multicast packet with a conventional BIER header having an entropy field that only includes a second variable entropy value for the ECMP load balancing.

5. The method of claim 1, wherein the accounting flag is further configured to trigger the next hop BIER routers to perform reporting their identifiers.

6. The method of claim 1, wherein each of the multicast flows is mapped to a distinct fixed accounting value among the fixed accounting values in the flow mappings.

7. The method of claim 1, wherein the multicast flows are divided into distinct sets associated with distinct virtual private networks (VPNs) and each of the distinct sets is mapped to a distinct fixed accounting value among the fixed accounting values of the flow mappings.

8. The method of claim 1, wherein:
the generating further includes encoding the reserved field of the BIER header with an egress timestamp corresponding to when the forwarding occurs.

9. The method of claim 8, wherein:
the generating further includes encoding the reserved field with a timing flag to indicate that the reserved field includes the egress timestamp.

10. The method of claim 1, wherein the fixed accounting values include one or more virtual private network (VPN) identifiers.

11. The method of claim 1, wherein the router is an ingress router of the network.

12. The method of claim 1, further comprising, at a second router in the network:
receiving the BIER packet forwarded by the router;
parsing the BIER header to retrieve the fixed accounting value; and
sending, to a controller of the network, a message including an identifier of the second router and the fixed accounting value.

13. An apparatus comprising:
multiple network input/output interfaces; and
a processor of a router configured to perform Bit Index Explicit Replication (BIER) forwarding of multicast packets in a network, the processor coupled to the multiple network input/output interfaces and configured to perform:
upon receiving a multicast packet of a multicast flow, accessing flow mappings in which multicast flows are mapped to fixed accounting values corresponding to the multicast flows;
generating a BIER header for the multicast packet by encoding a multi-segment entropy field of the BIER header with (i) a first segment that includes a variable entropy value for equal-cost multi-path (ECMP) load balancing, and (ii) a second segment that includes a fixed accounting value among the fixed accounting values that is mapped to the multicast flow in the flow mappings;
encoding a reserved field of the BIER header with an accounting flag configured to indicate that the multi-segment entropy field includes the fixed accounting value, and to trigger next hop BIER routers to perform flow accounting for the multicast flow and reporting accounting results along with the fixed accounting value;
encapsulating the multicast packet with the BIER header to produce a BIER packet; and
forwarding the BIER packet.

14. The apparatus of claim 13, wherein the processor is further configured to perform:
determining whether the multicast packet belongs to any of the multicast flows in the flow mappings; and
when the multicast packet belongs to the multicast flow in the flow mappings, performing the generating.

15. The apparatus of claim 13, wherein the accounting flag is further configured to trigger the next hop BIER routers to perform reporting their identifiers.

16. The apparatus of claim 13, wherein:

the generating further includes encoding the reserved field of the BIER header with an egress timestamp corresponding to when the forwarding occurs.

17. The apparatus of claim 16, wherein:

the generating further includes encoding the reserved field with a timing flag to indicate that the reserved field includes the egress timestamp.

18. A non-transitory computer readable medium encoded with instructions that, when executed by a processor of a router configured to perform Bit Index Explicit Replication (BIER) forwarding of multicast packets in a network, cause the processor to perform:

upon receiving a multicast packet of a multicast flow, accessing flow mappings in which multicast flows are mapped to fixed accounting values corresponding to the multicast flows;

generating a BIER header for the multicast packet by encoding a multi-segment entropy field of the BIER header with (i) a first segment that includes a variable entropy value for equal-cost multi-path (ECMP) load balancing, and (ii) a second segment that includes a fixed accounting value among the fixed accounting values that is mapped to the multicast flow in the flow mappings;

encoding a reserved field of the BIER header with an accounting flag configured to indicate that the multi-segment entropy field includes the fixed accounting value, and to trigger next hop BIER routers to perform flow accounting for the multicast flow and reporting accounting results along with the fixed accounting value;

encapsulating the multicast packet with the BIER header to produce a BIER packet; and forwarding the BIER packet.

19. The non-transitory computer readable medium of claim 18, wherein the accounting flag is further configured to trigger the next hop BIER routers to perform reporting their identifiers.

20. The non-transitory computer readable medium of claim 18, wherein the instructions to cause the processor to perform the generating include instructions to cause the processor to perform encoding the reserved field of the BIER header with an egress timestamp corresponding to when the forwarding occurs.

* * * * *